United States Patent [19]
Faller

[11] 3,899,247
[45] Aug. 12, 1975

[54] OPTICAL POSITION INDICATOR

[75] Inventor: Werner Faller, Bad Kreuznach, Germany

[73] Assignee: Jos. Schneider & Co. Optische Werke Kreuznach, Bad Kreuznach, Germany

[22] Filed: Dec. 3, 1973

[21] Appl. No.: 421,480

[30] Foreign Application Priority Data
Dec. 4, 1972 Germany.............................. 2259318

[52] U.S. Cl. ................... 353/40; 353/41; 356/156; 356/164; 356/168
[51] Int. Cl.......................... G01b 9/08; G01b 9/00
[58] Field of Search ........ 353/40, 41; 356/163, 164, 356/168, 156, 157

[56] References Cited
UNITED STATES PATENTS
2,556,871  6/1951  Degnan et al...................... 356/164

Primary Examiner—Richard E. Aegerter
Assistant Examiner—Larry Jones
Attorney, Agent, or Firm—Karl F. Ross; Herbert Dubno

[57] ABSTRACT

To indicate the position of a gauge, measuring rod or similar implement, a scale carrier mechanically coupled with that implement bears two sets of light-transmissive (i.e. transparent or reflective) areas aligned in the direction of displacement, the areas of at least one set being numerals or other distinctively shaped characters representing different measuring positions. In each measuring position an area of one set is aligned with an associated area of the other set in a common optical path including one or more ray-transposing reflectors so positioned that the images of the two areas, as focused by an objective in that path upon a display surface, move in opposite directions upon a displacement of the scale carrier. In a simple case, the areas of one set are small windows or mirrors acting as localized light emitters; for greater precision, they are the laterally reversed counterparts of the characters represented by the areas of the other set.

10 Claims, 5 Drawing Figures

PATENTED AUG 12 1975

3,899,247

SHEET 1

OPTICAL POSITION INDICATOR

FIELD OF THE INVENTION

My present invention relates to an optical indicator designed to provide a reading of the position of a gauge, a measuring rod or a similar implement which can be displaced between a multiplicity of discrete operating positions by linear, rotary or composite motion.

BACKGROUND OF THE INVENTION

It is known to couple a scale carrier mechanically with an implement whose positions are to be indicated, the scale carrier bearing a series of numbers or other characteristic symbols identifying the various positions. In any such position a symbol on the scale carrier registers with the field of view of an optical reader which projects the image of that symbol upon a display surface such as a screen or the face of a ground-glass plate. If the implement to be monitored occupies an off-position, the displayed character image is shifted from its normal location but may still be visible in whole or in part. This may lead to confusion (as where an incomplete "8" is read for a "3") and also fails to provide an unmistakable indication of exact coincidence of the position of the implement with the reference position displayed.

OBJECTS OF THE INVENTION

The general object of my present invention is to provide a system of this character which avoids the aforestated drawbacks and by simple means gives a true, unequivocal indication of position.

A more particular object is to provide means in such a system for obliterating the displayed character image as soon as the monitored implement moves out of its previously indicated operating position.

SUMMARY OF THE INVENTION

I realize the aforestated objects, in accordance with my present invention, by providing the scale carrier with two sets of light-transmissive areas on a contrasting background, the term "light-transmissive areas" including both transparent portions of an otherwise opaque body and reflective portions of an otherwise nonreflective body. The areas of each set are aligned in the direction of displacement of the carrier, e.g. along a straight line or an arc of a circle, and are so correlated with associated areas of the other set that, in any operating position, an individual area of the first set is aligned with an incoming branch and an associated area of the second set is alinged with an outgoing branch of a light path which extends between a light source and a display surface. This light path includes optical means, generally a combination of dioptric and catoptric elements, for superposing the image of an individual area of the first set upon the associated area of the second set and projecting the superposed images of the two areas upon the display surface, with intervening transposition of the light rays so that the two superposed images are shifted in opposite directions on that surface upon displacement of the scale carrier from its operating position. At least one of the two light-transmissive areas so imaged has the characteristic outline of a numeral or other mark identifying the corresponding operating position. For greater accuracy, I prefer to provide both correlated areas with the same characteristic outline (though not necessarily in the same size) but in laterally reversed or totally inverted relationship (depending on whether the ray transposition occurs in one or in two planes) so that the two superposed images register on the display surface or screen with minimum tolerance.

Although, in principle, image projection and ray transposition may be accomplished with the aid of a single catoptric element, i.e. a concave reflector, greater optical accuracy is realizable with the use of a flat reflector such as a mirror (or a combination of mirrors) or a prism in cascade with a dioptric projection objective. In a preferred instance I use two such projectors, the first one in the ray path between the two light-transmissive areas and the second one between the scale carrier and the display surface, this latter ojective being advantageously designed as a magnifier. The first projector may be disposed either symmetrically, with a magnification ratio of 1 : 1, or asymmetrically to enlarge the image of the first area focused upon the correlated second area.

The scale carrier could also be split into two rigidly interconnected halves respectively bearing the two sets of light-transmissive areas. In that case a projection objective inserted between the two halves will also operate as a ray transposer so as to obviate the need for a reflector in cascase therewith. Such a system may be conveniently used, for example, where the scale carrier is rotatably mounted on a shaft driven by a clockwise or the like to indicate time or to register the advance of a mechanical counter (e.g. an odometer).

BRIEF DESCRIPTION OF THE DRAWING

The above and other features of my invention will now be described in detail with reference to the accompanying drawing in which.

SPECIFIC DESCRIPTION

Figures 1, 1A:
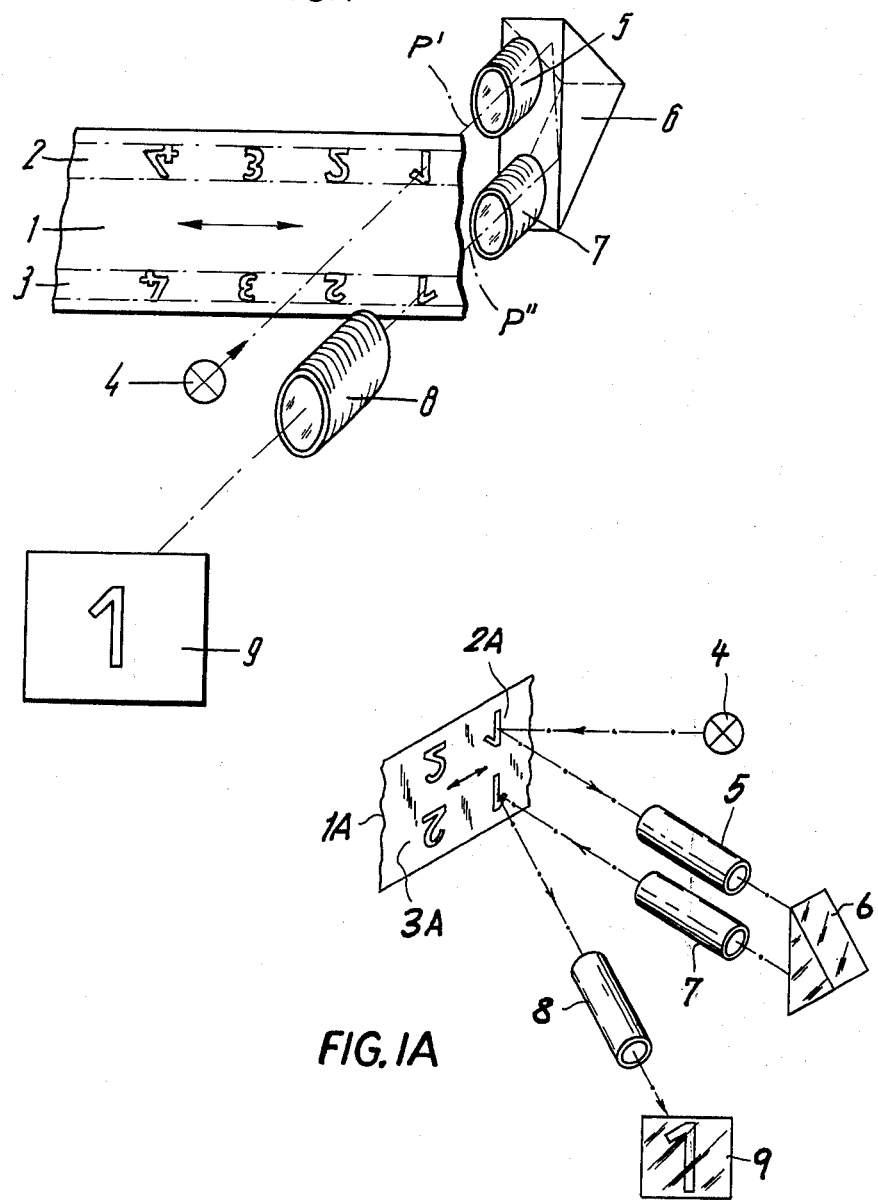
FIG. 1 is a somewhat diagrammatic view of a linear position indicator according to my invention.
FIG. 1A is a similar view of a modified linear indicator using reflective rather than transparent areas.

In FIG. 1 I have illustrated a position indicator comprising a scale carrier 1 in the shape of a ruler which is mechanically connected with an implement to be monitored, not shown; this implement could be a depth gauge, a pinion-driven rack or some other member displaceable between discrete operating positions. Scale carrier 1 is provided with two sets of characters disposed in a pair of rows 2, 3 adjacent its upper and lower edges; the characters in this instance are numerals and constitute transparent areas of the otherwise opaque carrier body. Corresponding numerals are transversely aligned so that, as particularly illustrated for the numeral 1, they respectively lie in an outgoing branch P' and an incoming branch P'' of a light path extending from a source 4 to a first lens group 5, a prism 6, a second lens group 7 and a magnifying objective 8 to a display surface 9 which may be formed by a ground-glass plate. Because of the inverting effect of objective 8, the numerals of both sets 2 and 3 are turned upside down in order to provide an upright image on the viewing surface 9; since the prism 6 transposes the light rays between branches P' and P" in a horizontal plane, the correlated characters of these two sets are laterally reversed with reference to each other.

In the illustrated operative position, the two lens groups 5 and 7 superpose the image of the upper character "1" upon the lower character "1" which is thereby fully illuminated; objective 8 projects the magnified image of the latter character, and therefore the superposed images of both characters, upon the receiving surface 1.

The two sets of characters in rows 2 and 3 need not be of the same size if the projection optic 5 – 7 behind carrier 1 has a magification ratio other than unity, as described hereinafter with reference to FIG. 4.

If the scale carrier 1 moves in either direction as indicated by the arrow, the two superposed outlines no longer coincide so that the image on screen 9 instantly disappears, dissolving at first into isolated light spots and vanishing then completely from the screen. The presence of a numerical display, therefore, unequivocally indicates that the scale carrier 1 and therefore the associated implement is in the operating position so identified.

In FIG. 1A I have shown a modification of the system of FIG. 1 which differs therefrom by the fact that the characters on rows 2A and 3A are reflective rather than transparent, the body of their carrier 1A being otherwise nonreflective. Light source 4 episcopically illuminates a properly positioned character of the top row 2A rather than transluminating it as in FIG. 1, the image of that upper character being again projected by the optical components 5 – 7 upon its counterpart in lower row 3A which is therefore fully illuminated upon precise alignment of these characters with the light path established by these components. As before, magnifying objective 8 projects the image of the lower character upon the viewing surface 9.

Figure 2:
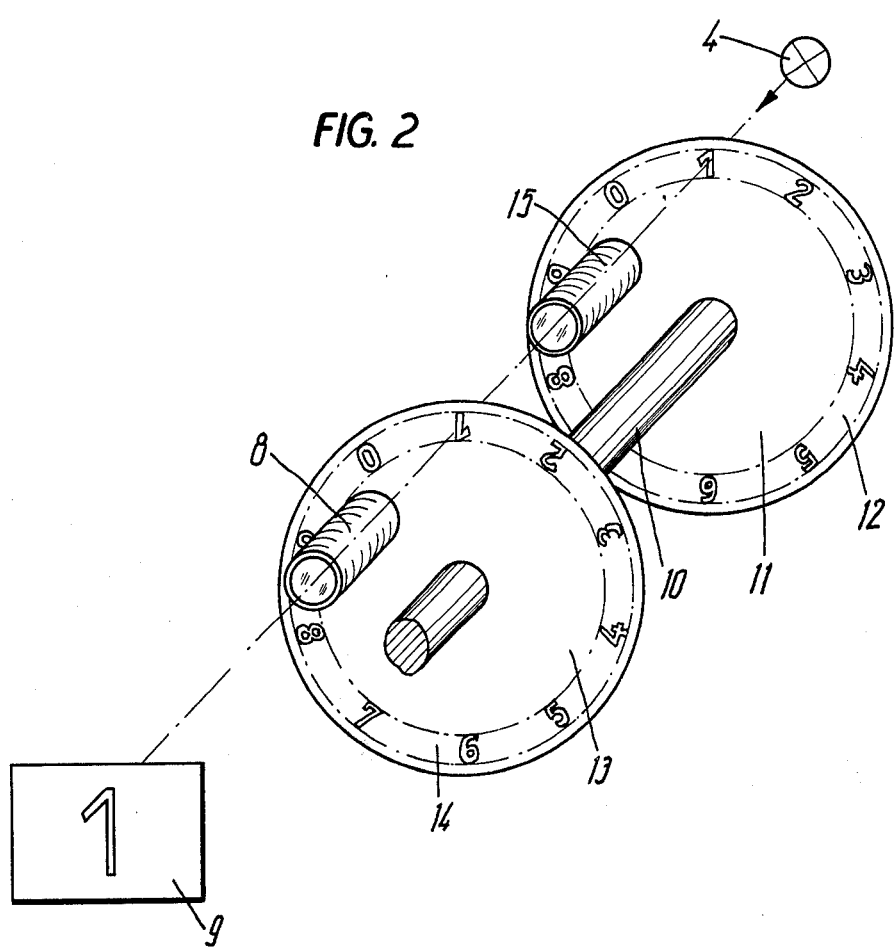
FIG. 2 is another such view showing a rotary indicator according to the invention.
Figure 3:
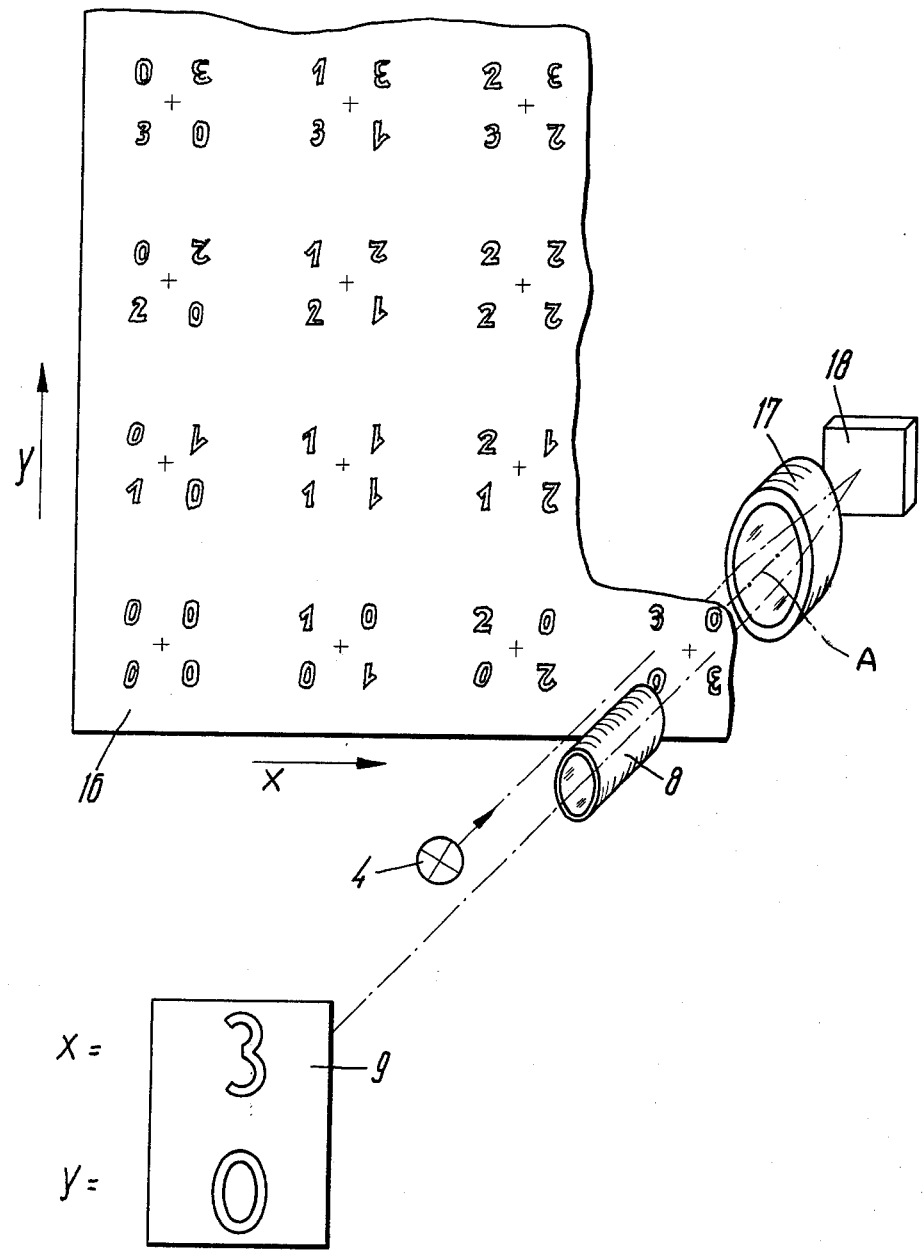
FIG. 3 is a further view similar to FIG. 1, illustrating an indicator operative in two orthogonal directions of displacement.
Figure 4:
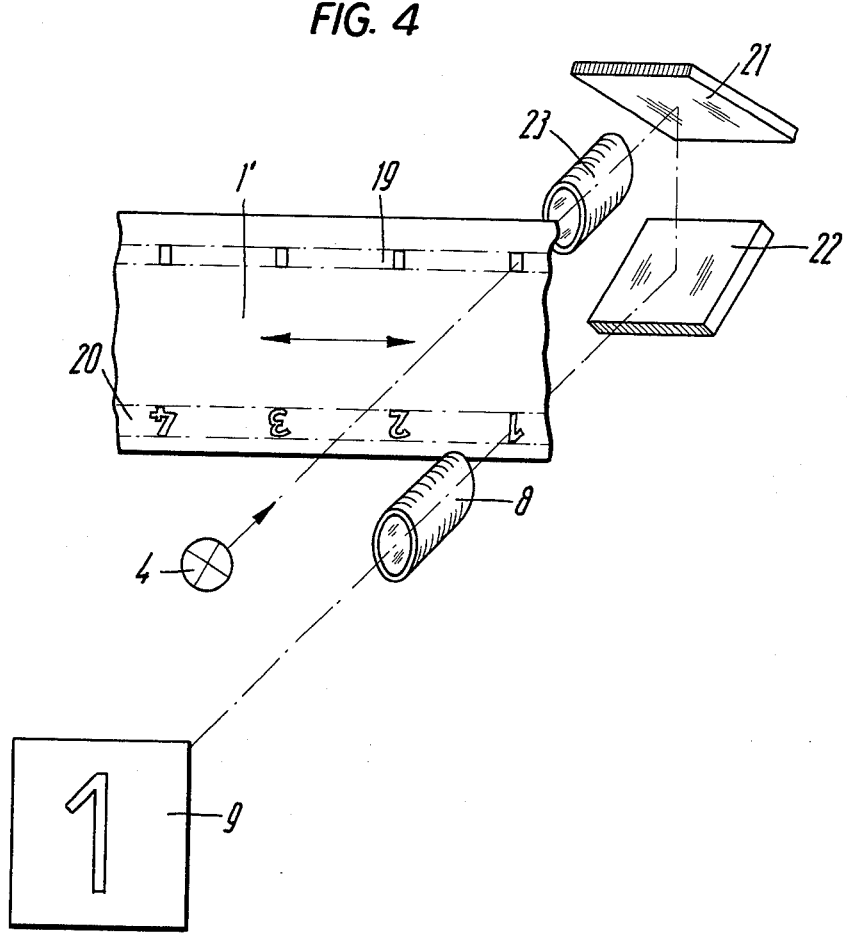
FIG. 4 is still another view similar to FIG. 1, showing a simplified scale carrier.

In an analogous manner, the embodiments of FIGS. 2 – 4 may be modified with substitution of reflectors for transparencies.

In FIG. 2 I have shown a scale carrier in the form of two parallel coaxial disks 11, 13 keyed to a common shaft 10 which is mechanically coupled, in a manner not further illustrated, with the implement to be monitored. Disks 11 and 13 bear respective sets of characters in two marginal zones 12 and 14, the characters consisting in this instance of digits 0 through 9 and being angularly aligned for successive translumination by the light source 4. The light path is here defined by a first projection objective 15, interposed between the disks 11 and 13, and by the magnifying second objective 8 located between disk 13 and display surface 9. Since objective 15 acts as a ray transposer in two planes, the characters of zone 14 are inverted with reference to those of zone 12. The operation is otherwise identical with that described above.

The system of FIG. 3 differs from that of FIG. 1 by the use of a scale carrier 16 displaceable in two orthogonal directions X and Y. Carrier 16 bears two sets of relatively inverted characters, each character consisting of a pair of numbers indicating the X and Y co-ordinates of the carrier position in which the axis A of a projection objective 17 registers with one of several reference points (+) on the carrier. The number pairs of the first set are disposed at left-hand corners and the correlated pairs of the second set are disposed at the right-hand corners of respective squares centered on the corresponding reference points (+). In the particular operating position illustrated, which is characterized by the co-ordinates $X = 3$ and $Y = 0$ as measured from the origin of the system, light from lamp 4 transluminates the left-hand numerals 3, 0 of the aligned four-character group and passes through the objective 17 on its way to a flat mirror 18 reflecting it back through the same objective onto the right-hand numerals 0, 3 of the group which are thereby fully illuminated; the magnified image of these numerals is projected by the objective 8 upon the receiving surface 9.

It will be noted that the single objective 17 in this instance replaces the two lens groups 5 and 7 of FIG. 1. Since the combination of this objective with mirror 18 results in a transposition of the light rays in two planes, corresponding numerals are disposed at diagonally opposite corners of the square and are relatively inverted.

In FIG. 4, finally, I have shown a simplified scale carrier 1' with an upper row of transparencies 19 and a lower row of transparencies 20, the upper transparencies being rectangles so dimensioned that their images projected upon the carrier 1' fully encompass the associated numerals of the lower row 20. Furthermore, the prism 6 has been replaced by two mirrors 21 and 22, inclined at angles of 45° to the horizontal, and a single projection objective 23 has been substituted for the two lens groups 5 and 7 of FIG. 1.

In contradistinction to the symmetrically disposed projectors of FIGS. 1 and 3, objective 23 is asymmetrically interposed between carrier 1' and the first mirror 21 so that its object distance differs from its image distance whereby the rectangular transparencies of row 19 are projected in magnified form upon the associated transparencies of row 4. The dimensions of the transparent rectangles of row 19 may therefore be considerably reduced, for more accurate position control, with reference to the numerical characteristics in row 20. Naturally, such magnification may also be used with the laterally reversed alphanumerical symbols of FIG. 1 or 1A as well as in the system of FIG. 2.

The coupling of the scale carrier with the associated implement to be monitored need not be rigid. In some instances it will be desirable to make that coupling adjustable, and/or to provide a slipping clutch which prevents the entrainment of the carrier beyond predetermined limits of its range of displacement.

I claim:

1. A position indicator comprising:
   a scale carrier displaceable in at least one dimension into a suscession of discrete operating positions, said carrier being provided with correlated first and second sets of light-transmissive areas on a contrasting background, the areas of each set following one another in a direction of displacement of said carrier;
   optical means forming a light path with an incoming branch and an outgoing branch respectively aligned in any of said operating positions with an individual area of said first set and with an associated area of said second set respectively correlated therewith, at least one of the two areas simultaneously disposed in said light path forming an alphanumerical symbol characterizing the particular operating position defined by the coincidence of said two areas in said light path;

image-receiving means forming a display surface in line with said outgoing branch of said light path; and a source of light in line with said incoming branch of said light path for illuminating an area of said first set in each of said operating positions;

said optical means including projection means for superposing the image of an illuminated area of said first set upon the associated area of said second set in any operating position to focus the superposed images of said illuminated area and said associated area upon said display surface, and ray-transposing means for shifting said superposed images in opposite directions on said display surfaces upon displacement of said scale carrier whereby said images register with each other only in the corresponding operating position.

2. A position indicator as defined in claim 1 wherein said scale carrier is displaceable in two orthogonal directions, the areas aligned with said branches in any operating position being divided into two pairs of characters representing two-dimensional co-ordinates of the operating position, said two pairs of characters being disposed at respective corners of a square with corresponding characters located in mutually inverted positions at diagonally opposite corners of the square.

3. A position indicator as defined in claim 1 wherein said projection means includes a first projector in an intermediate portion of said light path between said areas and a second projector between said scale carrier and said display surface.

4. A position indicator as defined in claim 3 wherein said second projector is a magnifying objective.

5. A position indicator as defined in claim 3 wherein said ray-transposing means comprises a reflector in casade with said first projector.

6. A position indicator as defined in claim 5 wherein said first projector is disposed in said incoming branch ahead of said reflector for magnifying the image of said illuminated area as superposed upon said associated area.

7. A position indicator as defined in claim 5 wherein said first projector comprises a lens positioned for traversal by light rays from said source impinging upon and reflected by said mirror.

8. A position indicator as defined in claim 3 wherein said scale carrier is divided into two rigidly interconnected sections respectively bearing said first and said second set of light-transmissive areas, said ray-transposing means being part of said first projector, the latter being interposed between said sections.

9. A position indicator as defined in claim 8 wherein said sections are disks rotatably mounted on a common shaft.

10. A position indicator as defined in claim 1 wherein the illuminated areas of said first set represent alphanumerical symbols in a predetermined position and the correlated areas of said second set respectively represent the same alphanumerical symbols in a relatively laterally reversed position.

* * * * *